Aug. 26, 1930.   G. M. DEMING   1,773,726
RELIEF VALVE
Filed May 28, 1926
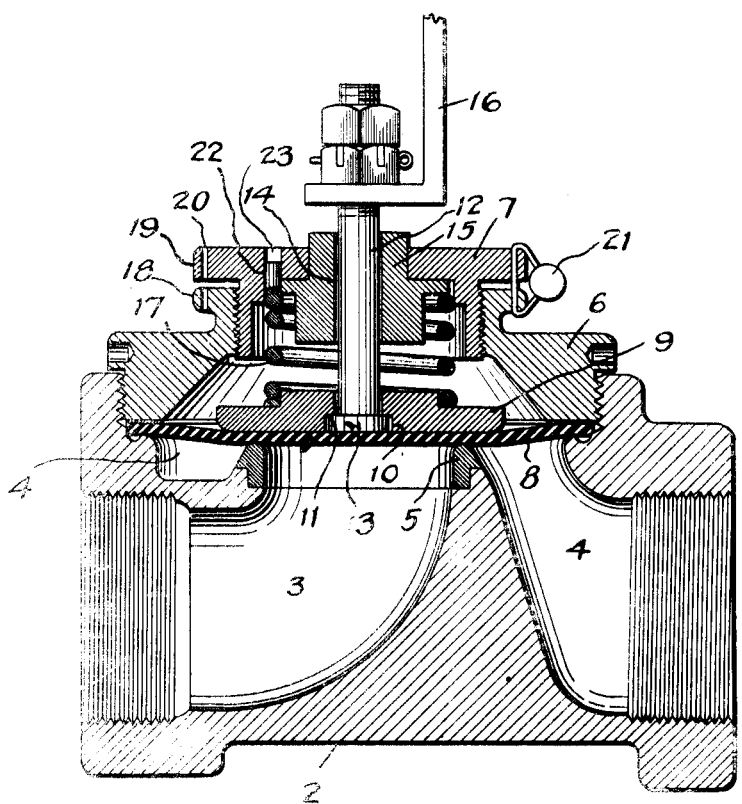
INVENTOR
George M. Deming
BY
ATTORNEY Patented Aug. 26, 1930

1,773,726

UNITED STATES PATENT OFFICE

GEORGE M. DEMING, OF JERSEY CITY, NEW JERSEY, ASSIGNOR TO AIR REDUCTION COMPANY, INCORPORATED, OF NEW YORK, N. Y., A CORPORATION OF NEW YORK

RELIEF VALVE

Application filed May 23, 1926. Serial No. 112,225.

This invention relates to a relief valve, suitable, for example, for use in connection with acetylene generators, for relieving the pressure automatically if it reaches a predetermined limit, and also for enabling the pressure to be vented manually at any time. The object of the invention, generally stated, is to provide a relief valve of this kind of simple and reliable character, designed for wide opening, adapted to open promptly at the intended relief pressure and to do so reliably and repeatedly over a very long period of time, having its working parts separated from the moisture-laden gas, tight seating, so organized that the automatic operation may not be affected by sticking of the manually operable valve stem, having simple and self-contained means for opposing tendency to vibratory discharge, wherein the setting of the valve can be readily sealed against tampering, wherein the valve structure can be opened without disturbing the setting or adjustment, and wherein the setting or relief pressure of the valve is internally safeguarded against alteration. With these and other objects and advantages in view, the invention may be said to comprise the parts, improvements and combinations hereinafter described in preferred embodiment, and more particularly pointed out in the appended claims.

The drawing is a central, vertical, longitudinal section through a relief valve embodying the invention.

The valve body 2 has an inlet space 3, to be connected with the generator or other pressure source or system, and an outlet space 4, to be connected with a vent pipe opening to the atmosphere at a suitable point, the outlet of the valve being substantially unrestricted. A narrow, annular, raised lip 5, preferably made of a separate piece, surrounds the top of the inlet space, and is surrounded by the outlet space.

The top of the body has a wide mouth, internally screw-threaded, to receive a detachable housing member 6. The top of this member is internally screw-threaded to receive a cap member 7, which is screwed up or down for adjustment.

A rubber diaphragm 8 is clamped at its margin between the body and the member 6, and serves both to wall off the mechanism from the fluid and to provide a seating surface cooperative with the lip 5. A diaphragm plate 9 backs the diaphragm, at the opposite side thereof from the lip, which it overlaps. This plate need not be secured to the diaphragm, and no connections are required passing through the diaphragm.

It will be observed that the area within the nozzle lip is comparatively large. The area of the diaphragm outside the nozzle lip, which is subject to pressure of escaping gas when the valve opens to relieve excess pressure at the nozzle side, is kept as small as is consistent with wide opening and unrestricted discharge to the atmosphere. The outside area of the diaphragm is greater than the inside area, in order to insure this wide opening, but the difference is within the same general order of magnitude, that is to say, the ratio of the outside area to the inside area is that of a small number to one, for example, about three to one. A high ratio would give an altogether different action, and in particular would result in excessive vibration on discharge, or would cause the valve to be held open for a prolonged period, or indefinitely, whereas it should close as promptly as possible after the excess pressure has been sufficiently relieved. The wide opening feature of the valve is important for quick relief of pressures that might otherwise be dangerous, but the outside area of the diaphragm is made small enough, consistent with the attainment of that object, to avoid or reduce as much as possible the tendency to vibratory discharge.

The ratio between the outside and inside diameters of the diaphragm might be low enough to substantially avoid vibration, but to secure the desired wide opening effect I wish to make the outside area somewhat larger, the consequent tendency to a vibratory discharge being checked or suppressed by the dampening means which will be described.

The diaphragm plate has a central opening 10, formed of two diameters with a downwardly-facing shoulder 11. A valve stem 12 is passed through this opening from beneath, so that its head 13, of comparatively small diameter, abuts the shoulder. With the back of the head thus abutting the shoulder, the face of the head is substantially flush with the face of the diaphragm plate, so as to afford continuous backing for the diaphragm. It is important that the lower end of the stem, which contacts with the diaphragm, be of considerably smaller area than the nozzle opening, in order that the diaphragm may yield around the head of the stem and permit excess pressure to escape even though the stem should be stuck. The upper part of the valve stem passes through a guide-bore 14 formed in a dampening bushing 15, which is preferably a separate part, though it could be integral with the cap 7. A pull link 16 engages the stem outside the housing.

A valve spring 17 encircles the valve stem inside the housing, and reacts between the adjusting member 7 and the diaphragm plate 9, the latter forming the upper portion of the movable valve part, cooperative with the lip 5.

It is important that the relation between the valve stem 12 and the part 9 is such that the valve stem constitutes a tension member only, acting in that capacity when the stem is pulled by the link 16 to open the valve manually. In the automatic operation of the valve no appreciable compressive stress is imparted to the valve stem, since the part 9 is free to move relatively to the stem. The effect of this is that the setting of the valve, i. e., its relief pressure for any given adjustment, can not be greatly altered either by an attempt at external loading of the valve, or as the result of any accidental obstruction to the free movement of the stem, as by reason of dirt in the guide, providing that the head 13 of the stem is of comparatively small diameter in relation to the area of the diaphragm opposed to the diaphragm plate between said head and the lip 5.

The bore 14 of the dampening device is comparatively long to constitute a guide and is large enough in diameter to permit of free longitudinal movement of the valve stem, the stem being moderately loose in the guide as indicated by the clearance. This device nevertheless provides a sufficient element of friction, in the automatic operation of the valve, to restrain any tendency toward a vibratory discharge being established. The effect of the dampening device results from its nature, and from the natural lateral distortion, or buckling tendency, of a fairly weak valve spring introducing a side thrust on the diaphragm end of the valve stem, causing the stem to cant somewhat so that it rubs in its guide, creating a frictional dampening effect, without, however, loading or binding the valve in any degree to cause it to fail to open promptly and fully at the selected relief pressure. Such slight canting of the valve stem does not affect the even and accurate seating of the valve on the lip, because of the flexible connection between the stem and the part 9, it being possible for the stem to occupy a position somewhat inclined from the perpendicular without tending to tilt the said part.

The flanges 18 and 19, valve housing 6 and cap 7 are each provided with a circular series of holes 20, adapted to receive the wire of a lead seal 21, which can thus be applied at any adjustment of the member 7 to secure the setting of the valve.

The valve structure can be readily opened, for inspection, cleaning, or replacement of the diaphragm or other parts, by unscrewing the housing 6 from the body. The setting or adjustment is not affected when this is done, since the member 7 is not disturbed in its position relative to the member 6, to which it is sealed.

Means are also provided for restraining the valve spring against turning about its nominal axis relatively to the housing and its cap, either when the valve structure is opened as described, or, while the valve is closed, as the result of vibration or the operation of the valve. Such rotation of the spring, if it is permitted, will alter the critical relief pressure at which the valve will open the communication between the inlet and the outlet. This may be explained by the fact of the cap or adjusting member 7 being slightly eccentric to the valve lip, owing to small errors in the manufacture of the valve, or to the natural lateral distortion of the spring, so that any rotation of the spring about its axis and relative to the lip would result in a change in the setting. To overcome this defect, the upper end of the spring 17 is formed with a lug 22, which is anchored in a hole 23 in the member 7.

While the preferred embodiment of the invention has been described in detail, it will be understood that there may be various changes and substitutions without departing from essentials, that certain features may be used without others, and that terms of orientation are relative, as the device need not occupy the position shown in the drawing. The language of the appended claims is intended to cover all the generic and specific features of the invention.

What I claim as new is:

1. A relief valve having inlet and outlet spaces, a nozzle lip the interior of which forms the terminus of the inlet space, a diaphragm held in the body and normally seated against said nozzle, a diaphragm plate backing said diaphragm, an externally operable stem having a flexible connection with said plate, dampening means wherein said stem is solely and loosely guided, and a spring adapted to produce lateral pressure and friction between said stem and dampening means sufficient to check tendency to vibratory discharge.

2. A relief valve having inlet and outlet spaces, a nozzle lip the interior of which forms the terminus of the inlet space, a diaphragm held in the body and normally seated against said nozzle, a diaphragm plate backing said diaphragm, an externally operable stem having a flexible connection with said plate, dampening means wherein said stem is solely and loosely guided and a spring intermediate said dampening means and diaphragm plate adapted to produce lateral pressure and friction between said stem and dampening means sufficient to check tendency to vibratory discharge.

3. An automatic and manual relief-valve having, a structure with inlet and outlet spaces, the latter of which is substantially unrestricted to the atmosphere, a nozzle lip the interior of which forms the terminus of the inlet space, a diaphragm held in the body and normally seated against said nozzle, the area of the diaphragm outside the nozzle lip being greater than the area inside in the nozzle lip in a ratio not greater than a small number to one, a movable diaphragm plate backing said diaphragm, a valve spring pressing upon said diaphragm plate, said diaphragm and spring being designed to yield automatically to predetermined excess pressure in the inlet space and to close the valve automatically when the pressure is sufficiently relieved, and an externally operable longitudinally movable valve stem perpendicular to said diaphragm and connected with said diaphragm plate as a tension member but not as a compression member.

4. An automatic and manual relief-valve having, a structure with inlet and outlet spaces, the latter of which is substantially unrestricted to the atmosphere, a nozzle lip the interior of which forms the terminus of the inlet space, a diaphragm held in the body and normally seated against said nozzle, the area of the diaphragm outside the nozzle lip being greater than the area inside in the nozzle lip in a ratio not greater than a small number to one, a movable diaphragm plate backing said diaphragm, said diaphragm plate being so disposed as to be substantially free from frictional restraint against yielding with the diaphragm, a valve spring pressing upon said diaphragm plate, said diaphragm and spring being designed to yield automatically to predetermined excess pressure in the inlet space and to close the valve automatically when the pressure is sufficiently relieved, and an externally operable longitudinally movable valve stem perpendicular to said diaphragm and connected with said diaphragm plate as a tension member but not as a compression member.

5. An automatic and manual relief-valve having, a structure with inlet and outlet spaces, the latter of which is substantially unrestricted to the atmosphere, a nozzle lip the interior of which forms the terminus of the inlet space, a diaphragm held in the body and normally seated against said nozzle, the area of the diaphragm outside the nozzle lip being greater than the area inside in the nozzle lip in a ratio not greater than a small number to one, a movable diaphragm plate backing said diaphragm and having a central opening, a valve spring pressing upon said diaphragm plate, said diaphragm and spring being designed to yield automatically to predetermined excess pressure in the inlet space and to close the valve automatically when the pressure is sufficiently relieved, and manual operating means for opening the valve comprising a valve stem having a head in said opening of the diaphragm plate for withdrawing the latter, the diaphragm plate being free to move away from said head in the automatic operation of the valve.

6. An automatic and manual relief valve having a structure with inlet and outlet spaces, the latter of which is substantially unrestricted to the atmosphere, a nozzle lip the interior of which forms the terminus of the inlet space, a diaphragm held in the body and normally seated against said nozzle, the ratio of the area of the diaphragm outside the nozzle lip to the area inside said lip being not greater than a small number to one, a movable diaphragm plate backing said diaphragm and having a central opening, a valve spring pressing upon said diaphragm plate, said diaphragm and spring being designed to yield automatically to predetermine excess pressure in the inlet space and to close the valve automatically when the pressure is sufficiently relieved, and manual operating means for opening the valve comprising a valve stem having a head in said opening of the diaphragm plate for withdrawing the latter, the diaphragm plate being free to move away from said head in the automatic operation of the valve, said diaphragm plate having a shoulder with which the back of said head cooperates and the face of said head being substantially flush with the face of the diaphragm plate with the back of the head in contact with said shoulder.

7. An automatic and manual relief-valve having a structure with inlet and outlet spaces, the latter of which is substantially unrestricted to the atmosphere, a nozzle lip the interior of which forms the terminus of the inlet space, a diaphragm held in the body and normally seated against said nozzle, the ratio of the area of the diaphragm outside the nozzle lip to the area inside said lip being not greater than a small number to one, a movable diaphragm plate backing said diaphragm and having a central opening, a valve spring pressing upon said diaphragm plate, said diaphragm and spring being designed to yield automatically to predetermine excess pressure in the inlet space and to close the valve automatically when the pressure is sufficiently relieved, and manual operating means for opening the valve comprising a valve stem having a head in said opening of the diaphragm plate for withdrawing the latter, the diaphragm plate being free to move away from said head in the automatic operation of the valve, said head being considerably smaller in area than the nozzle opening.

8. An automatic and manual relief-valve having, a structure with inlet and outlet spaces, the latter of which is substantially unrestricted to the atmosphere, a nozzle lip the interior of which forms the terminus of the inlet space, a pliable, elastic rubber diaphragm held in the body and normally seated against said nozzle, the area of the diaphragm outside the nozzle lip being greater than the area inside in the nozzle lip in a ratio not greater than a small number to one, a movable diaphragm plate backing said diaphragm, a valve spring pressing upon said diaphragm plate, said diaphragm and spring being designed to yield automatically to predetermined excess pressure in the inlet space and to close the valve automatically when the pressure is sufficiently relieved, and an externally operable longitudinally movable valve stem perpendicular to said diaphragm and connected with said diaphragm plate as a tension member but not as a compression member.

9. An automatic and manual relief-valve having, a structure with inlet and outlet spaces, the latter of which is substantially unrestricted to the atmosphere, a nozzle lip the interior of which forms the terminus of the inlet space, a pliable, elastic rubber diaphragm held in the body and normally seated against said nozzle, the ratio of the area of the diaphragm outside the nozzle lip to the area inside said lip being not greater than a small number to one, a movable diaphragm plate backing said diaphragm and having a central opening, a valve spring pressing upon said diaphragm plate, said diaphragm and spring being designed to yield automatically to predetermined excess pressure in the inlet space and to close the valve automatically when the pressure is sufficiently relieved, and manual operating means for opening the valve comprising a valve stem having a head in said opening of the diaphragm plate for withdrawing the latter, the diaphragm plate being free to move away from said head in the automatic operation of the valve, said diaphragm plate having a shoulder with which the back of said head cooperates and the face of said head being substantially flush with the face of the diaphragm plate with the back of the head in contact with said shoulder.

10. An automatic and manual relief-valve having, a structure with inlet and outlet spaces, the latter of which is substantially unrestricted to the atmosphere, a nozzle lip the interior of which forms the terminus of the inlet space, a diaphragm held in the body and normally seated against said nozzle, the ratio of the area of the diaphragm outside the nozzle lip to the area inside said lip being not greater than a small number to one, a movable diaphragm plate backing said diaphragm, a valve spring pressing upon said diaphragm plate, said diaphragm and spring being designed to yield automatically to predetermined excess pressure in the inlet space and to close the valve automatically when the pressure is sufficiently relieved, an externally operable longitudinally movable valve stem perpendicular to said diaphragm and connected with said diaphragm plate as a tension member but not as a compression member, and a device providing a bore wherein said stem is freely movable in automatic operation with dampening friction in the bore, the action of the spring on the diaphragm plate producing lateral pressure and friction between the stem and bore so as to check tendency to vibratory discharge.

11. An automatic and manual relief-valve having, a structure with inlet and outlet spaces, the latter of which is substantially unrestricted to the atmosphere, a nozzle lip the interior of which forms the terminus of the inlet space, a diaphragm held in the body and normally seated against said nozzle, the ratio of the area of the diaphragm outside the nozzle lip to the area inside said lip being not greater than a small number to one, a movable diaphragm plate backing said diaphragm, a valve spring pressing upon said diaphragm plate, said diaphragm and spring being designed to yield automatically to predetermined excess pressure in the inlet space and to close the valve automatically when the pressure is sufficiently relieved, an externally operable longitudinally movable valve stem perpendicular to said diaphragm and connected with said diaphragm plate as a tension member but not as a compression member, and dampening means wherein said stem is guided, the spring being adapted to produce lateral pressure and friction between said stem and said dampening means sufficient to check tendency to vibratory discharge due to the relation between the outside and inside diameters of the diaphragm.

GEORGE M. DEMING.